J. F. KITCHEN.
MACHINE FOR FORMING GARMENT STAYS.
APPLICATION FILED DEC. 30, 1912.

1,118,020.

Patented Nov. 24, 1914.
5 SHEETS—SHEET 1.

FIG. 1

J. F. KITCHEN.
MACHINE FOR FORMING GARMENT STAYS.
APPLICATION FILED DEC. 30, 1912.

1,118,020.

Patented Nov. 24, 1914.
5 SHEETS—SHEET 2.

WITNESSES

INVENTOR

J. F. KITCHEN.
MACHINE FOR FORMING GARMENT STAYS.
APPLICATION FILED DEC. 30, 1912.

1,118,020.

Patented Nov. 24, 1914.
5 SHEETS—SHEET 3.

FIG. 4

WITNESSES

INVENTOR

J. F. KITCHEN.
MACHINE FOR FORMING GARMENT STAYS.
APPLICATION FILED DEC. 30, 1912.

1,118,020.

Patented Nov. 24, 1914.
5 SHEETS—SHEET 4.

WITNESSES

INVENTOR

J. F. KITCHEN.
MACHINE FOR FORMING GARMENT STAYS.
APPLICATION FILED DEC. 30, 1912.

1,118,020.

Patented Nov. 24, 1914.
5 SHEETS—SHEET 5.

WITNESSES

INVENTOR

UNITED STATES PATENT OFFICE.

JOHN F. KITCHEN, OF MEADVILLE, PENNSYLVANIA, ASSIGNOR TO THE SPIRELLA COMPANY, OF MEADVILLE, PENNSYLVANIA, A CORPORATION OF PENNSYLVANIA.

MACHINE FOR FORMING GARMENT-STAYS.

1,118,020.  Specification of Letters Patent.  Patented Nov. 24, 1914.

Application filed December 30, 1912. Serial No. 739,296.

*To all whom it may concern:*

Be it known that I, JOHN F. KITCHEN, a resident of Meadville, in the county of Crawford and State of Pennsylvania, have invented a new and useful Improvement in Machines for Forming Garment-Stays, of which the following is a specification.

This invention relates to machines for bending wire back and forth into a series of successive oppositely disposed loops to form a flat wire spring particularly designed for corset stays.

The invention is an improvement upon the machine shown in my prior application for machine for forming wire stays, filed July 25, 1912, Serial No. 711,512.

The object of the present invention is to simplify and improve the general construction and arrangement of the prior machine so as to render the same simple and strong in construction and efficient and durable in operation.

More specifically, one object of the present invention is to provide in a machine of the character described, improved means or mechanism for oscillating the bender arm shaft, which is mechanically efficient and is positive in operation, and wherein the bender arm may be given all the necessary or desired adjustments, to vary the form or arrangement of the loops of the wire fabric being formed.

Another object of the invention is to provide improved means for supporting or carrying the bender arm shaft, so that it may be easily adjusted, but is nevertheless rigidly held.

A further object of the invention is to provide, in a machine of the character described, positive means for moving the loop-forming pins, or the members supporting the same, longitudinally of the machine, to positively feed the wire fabric being formed therethrough, which means is independent of the means for raising and lowering the loop-forming pins to enable the wire to be bent therearound in order to form the loops of the fabric.

Another object of the invention is to provide, in a machine of the character described, an improved tension device for regulating the feed of the wire to the machine, and wherein, also, the tension on the wire may be varied as the bender arm swings from side to side of the machine and during different periods in the formation of the successive loops or eyes.

Another object of the invention is to provide, in connection with the machine of the character described, suitable means for moving the bender arm, and more particularly the extreme end thereof, horizontally toward and from the loop-forming pins, as the bender arm swings from side to side of the machine, to assist in varying the tension on the wire and in properly bending the same around the loop-forming pins.

Other objects of the invention are in part obvious and in part will appear more definitely from the description hereinafter.

The machine shown in the drawings operates to bend the wire in substantially the same manner as the machine illustrated in my prior application heretofore referred to. It embodies loop forming pins around which the wire is coiled or bent to form the oppositely disposed loops of the fabric, and which pins are alternately raised and lowered as the fabric is formed. The wire is bent around said pins by a combined guiding and bending arm, which is mounted upon a shaft disposed in or near the central longitudinal plane of the machine, which shaft is oscillated to swing the bender arm from side to side of the machine and bend or coil the wire about the loop forming pins.

In the present machine the loop forming pins are indicated at 1 and are formed of hardened steel, and are either integral with or attached to die or pin blocks 2, having shanks 3 which are clamped in sockets formed by the split ends 4 of the pin block carriers or levers 5, 5$^a$. Suitable clamping bolts or screws 6 are threaded through the split ends of the levers to enable the die blocks 2 to be clamped therein, and readily removed and replaced when desired. Pin block levers 5, 5$^a$ are pivoted at their rear ends upon shaft sections or members 7, 7$^a$, located in suitable journals at the rear of the machine, and are oscillated about their pivots by cams 8, 8$^a$ on the main driving shaft 9, which extends transversely of the frame 10 of the machine, is journaled in suitable bearings therein, and is provided with the usual driving pulleys 9$^a$. Said cams are provided with cam grooves or tracks 11, 11$^a$ in which travel pins or rollers 12 mounted on the pin block levers 5, 5$^a$ between the pivots thereof and the pin blocks carried thereby. It will of course be understood that the cams 8, 8$^a$ are secured to the main shaft and are disposed at angles of 180° to each other, so that the pin block levers rise and fall alternately, as is usual.

Figures 5, 13:
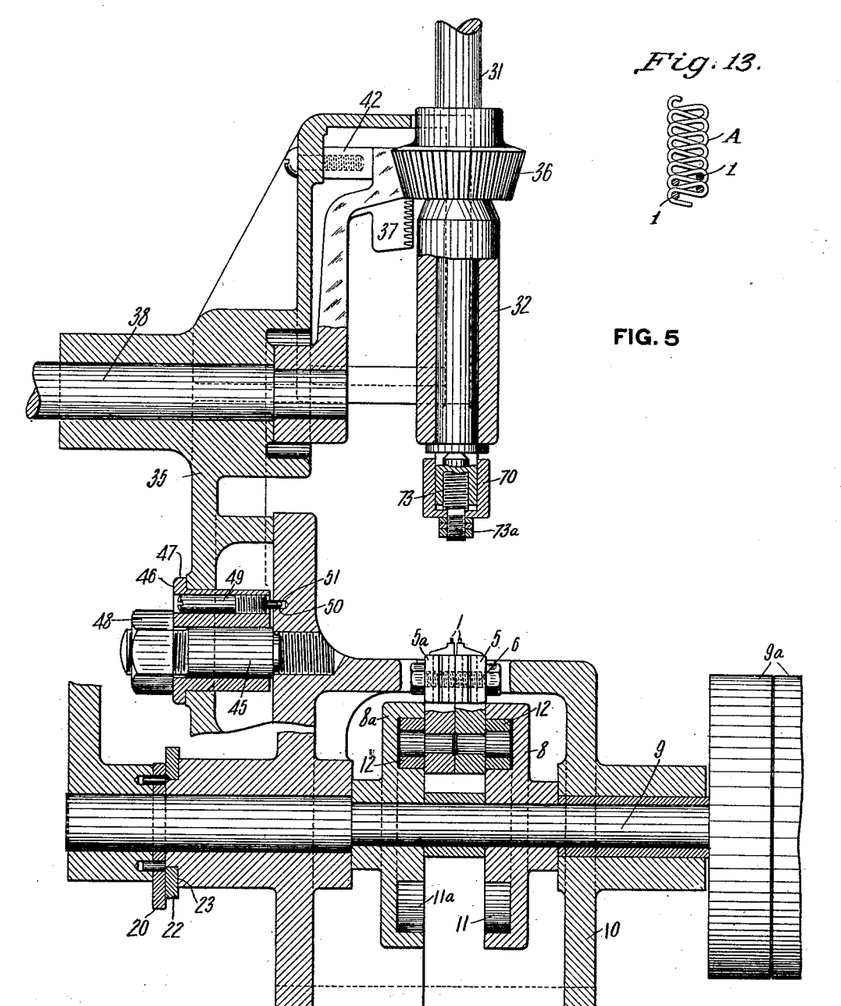
Fig. 5 is a transverse sectional elevation, taken on the line 5—5, Fig. 4.
Fig. 13 is a plan view of one form of wire fabric produced by the machines.
Figure 6:
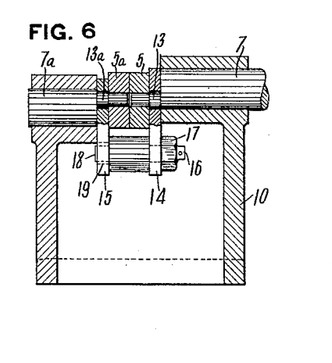
Fig. 6 is a detail sectional elevation on the line 6—6, Fig. 4, and showing on a reduced scale the mechanism for feeding the wire fabric through the machine.
Figure 7:
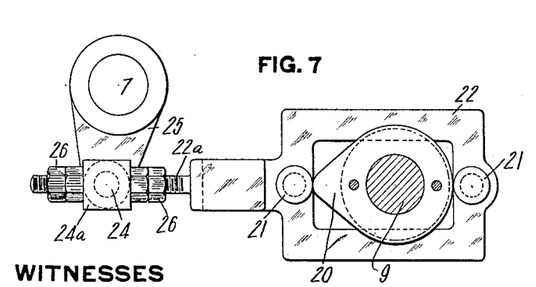
Fig. 7 is a detail side elevation, corresponding to Fig. 2, and showing the operating connections for the fabric feeding mechanism.

The wire fabric A being coiled or formed around the loop forming pins 1, and illustrated in Fig. 13, is positively fed through the present machine by positively moving the pin block levers horizontally. This is accomplished as follows: Shaft sections or members 7 and 7$^a$ are mounted end to end but at different levels or out of line with each other, as shown in Fig. 6, and are provided with reduced stub ends or trunnions 13, 13$^a$, on which the pin block levers 5, 5$^a$ are directly journaled, and which are substantially in line with each other. Rigidly secured to the trunnion 13, between the lever 5 carried thereby and the end of the shaft section 7, is an arm or member 14. An arm 15 is likewise rigidly secured to the trunnion 13$^a$ between the end of shaft section 7$^a$ and the lever 5$^a$ carried thereby. Said arms 14 and 15 are connected by a pin or bolt 16, rigidly secured by a nut 17 to one of the arms, as at 14, and having its other end portion 18 engaged in a longitudinal slot 19 in the other arm 15. Near one end the main operating shaft 9 is provided with a feed cam 20 rigidly secured to rotate therewith and the lobe of which engages alternately with pins or rollers 21 on a yoke 22, which embraces the shaft and is guided by and travels on a reduced and flattened portion 23 of that portion of the frame which forms a journal for shaft 9. Yoke 22 is provided with a threaded rod 22$^a$ carrying a pin 24 pivotally connected to an arm 25 on shaft section or member 7. At each rotation of the main shaft 9 the yoke 22 is moved first in one direction and then in the other to oscillate shaft section 7 about its axis. The pin or trunnion 13 carried by shaft member 7 is eccentric to the axis thereof and consequently swings about the axis of shaft 7 in a general horizontal direction as the shaft member rotates, thus causing the pin block lever 5 connected thereto to move longitudinally in the plane of the wire fabric being formed. At the same time the arm 14 is swung about the axis of shaft 7 and the pin 16 causes a like oscillation of the arm 15 and rotates shaft member 7$^a$. The trunnion 13, however, is on one side of the axis of shaft 7 while the trunnion 13$^a$ is on the other side of the axis of the shaft member 7$^a$. Consequently, while both shaft members 7 and 7$^a$ rotate in the same direction, the trunnions 13 and 13$^a$ are moved horizontally of the machine in opposite directions, so that the pin block levers 5 are alternately moved longitudinally of the machine. It will of course be understood that the timed relation between the cams 8 and 8$^a$, which raise and lower the pin block levers 5, and 5$^a$, and the cam 20 which reciprocates the same horizontally, is such that each pin block lever is moved rearwardly while in its raised position and forwardly when depressed, so that the wire fabric being formed is fed through the machine and away from the loop-forming pins by a step-by-step movement.

To enable the pin block levers 5, 5$^a$ to be adjusted slightly with reference to each other longitudinally of the machine and thereby secure proper relative positions of the loop-forming pins and produce a symmetrical stay, the pin or pivot 24 connecting the yoke 22 and arm 25 is carried by a block 24$^a$ adjustable longitudinally of the rod 22$^a$ on which it is supported, suitable nuts 26 being threaded onto said rod on opposite sides of the block for securing the same in adjusted position.

The bender arm or member 30 is secured to the lower end of a shaft 31, located, as stated, in or near the central longitudinal plane of the machine, and journaled in a bearing member 32 formed on a quadrant or plate 33 secured by bolts 34 to the upper portion of an adjustable arm, standard or supporting member 35, mounted so as to be adjustable about an axis transverse to the machine and passing through the loop-forming pins, so that the angularity or inclination of the bender arm shaft to the plane of the stay being formed may be varied. This provides, as in the prior machine, for different degrees of tilt or inclination of the successive eyes or loops to the plane of the stay being formed.

Shaft 31, near its upper end, is provided with a bevel gear 36 operatively engaged by a gear segment 37 fixedly secured to a transverse shaft 38 journaled in the standard or supporting member 35 and having connected to the outer end thereof an arm 39 pivotally connected to a link or connecting rod 40, which in turn is connected at its other end to a crank arm 41 rigidly secured to the outer end of the main driving shaft 9. As the driving shaft 9 is rotated, arm 41 swings completely around and causes the link or rod 40 to oscillate arm 39 and shaft 38, which in turn oscillates gear segment 37 and rotates the bender arm shaft 31 alternately in opposite directions. This bends the wire alternately around the loop forming pins, which rise and fall alternately in timed relation with the oscillating movement of the bender shaft, as in the prior machine. To maintain the gear segment 37 and bevel pinion 36 in mesh with each other and prevent play and lost motion, a block 42 is secured to the inner face of the standard or supporting member 35 opposite gear 36, which block acts as a backing member to take the thrust on the gear segment 37 and thus keep it in mesh with the pinion 36.

The mechanism described provides a direct and positive connection between the main operating shaft and the oscillating shaft which supports the bender arm, and dispenses entirely with bolts, bands, chains and the like, thus preventing lost motion and securing high efficiency in operation. The amplitude of oscillation of the bender arm may be adjusted or varied by adjusting the pivot 43 between the link or connecting rod 40 and crank arm 41 in an axial slot 41ª in said crank arm. The angular position of the bender arm with respect to the axis around which it oscillates may be adjusted as follows: One end of arm 39, which is connected to the shaft 38 is in the form of a split sleeve 44, and is provided with a clamping bolt or bolts 45, so that the arm may be clamped on the shaft in any angular position thereon. A washer 46 is preferably secured to the end of shaft 38 by a screw 47 threaded thereinto, so as to hold the arm 39 in position on said shaft while being adjusted thereon.

The bender arm supporting standard 35, as stated, is supported in such a manner as to be adjustable about an axis transverse to the machine and passing through the loop forming pins. Specifically, this member is mounted upon a stud 45 threaded into a fixed portion of the main frame, the axis of said stud being substantially in line with the loop forming pins and slightly below their highest position. More immediately the bender arm supporting standard is carried by an eccentric sleeve 46 having an outer cylindrical surface on which the bender arm supporting member is journaled and having an eccentric bore fitting the stud 45. Said eccentric 46 is provided with a flange or collar 47 fitting against a boss or raised portion of the shaft supporting standard 35.

To vary the angular relation of the shaft 31 relative to the plane of the stay being formed, the shaft supporting standard 35 is rotated on the eccentric sleeve 46, and when in proper position a nut 48 on the outer end of the stud 45 is turned up to cause the flange 47 on the sleeve 46 to press against the outer face of said member and clamp the same rigidly to the fixed frame 10. To adjust the entire shaft supporting standard 35 and all the parts carried thereby substantially longitudinally of the axis of the bender shaft, and thereby adjust the bender arm vertically with reference to the plane of the stay being formed, the nut 48 may be loosened and the eccentric sleeve 46 rotated about the stud 45 as an axis. Preferably, a locking pin 49 is mounted in a bore in the eccentric 46 and is provided at its inner end with a projecting pin 50 arranged to engage any one of a number of sockets or apertures 51 in the fixed frame 10, so that the eccentric 46 can be locked in adjusted position by screwing up the locking member 49 until the pin 50 enters one of said apertures.

Above the pin blocks 2 and coöperating therewith is a presser foot for holding the stay being formed down on the pin blocks while the wire is being bent around the loop forming pins. Said presser foot comprises a foot or member 55 detachably secured in the end of an arm 56 clamped by a screw or bolt 57 in a socket 58ª formed in a slotted shaft 58 mounted to rotate on its own axis between pivot screws 59 secured in lugs attached to the main frame 10. Said shaft, at one end, is provided with a rigid arm 60 pivotally connected at its lower end to a rod or bar 61 extending loosely through an aperture in boss 62 on the main frame, said rod or bar being threaded at its end to receive a winged nut 63. Tension spring 64 is connected at one end to the rod or bar 61 adjacent to the end of arm 60 and at its other end is connected to the inner end of a bolt or threaded member 65, provided with a nut 66 on the outside of the frame. By screwing up the winged nut 63 the rod or bar 61 may be adjusted endwise toward the outside of the main frame, thus swinging the arm 60 to the left in Fig. 1 and raising the presser foot from the pin blocks. The same winged nut 63 may be slacked off when the machine is running so that the presser foot will be pressed down upon the fabric passing over the pin blocks by the tension of spring 64, which may be regulated in strength by adjusting the nut 66. The pressure of the presser foot may be regulated by means of the nut 66 and spring 64, but if desirable the adjustment may be made more positive by eliminating spring 64 and substituting for the spring a solid connection similar to the rod or bar 61, the spring or give inherent in the lever and the long stem of the presser foot, in most cases being sufficient to take care of slight inaccuracies in workmanship or in operation of the pin block levers, loop forming pins, etc.

Figure 1:
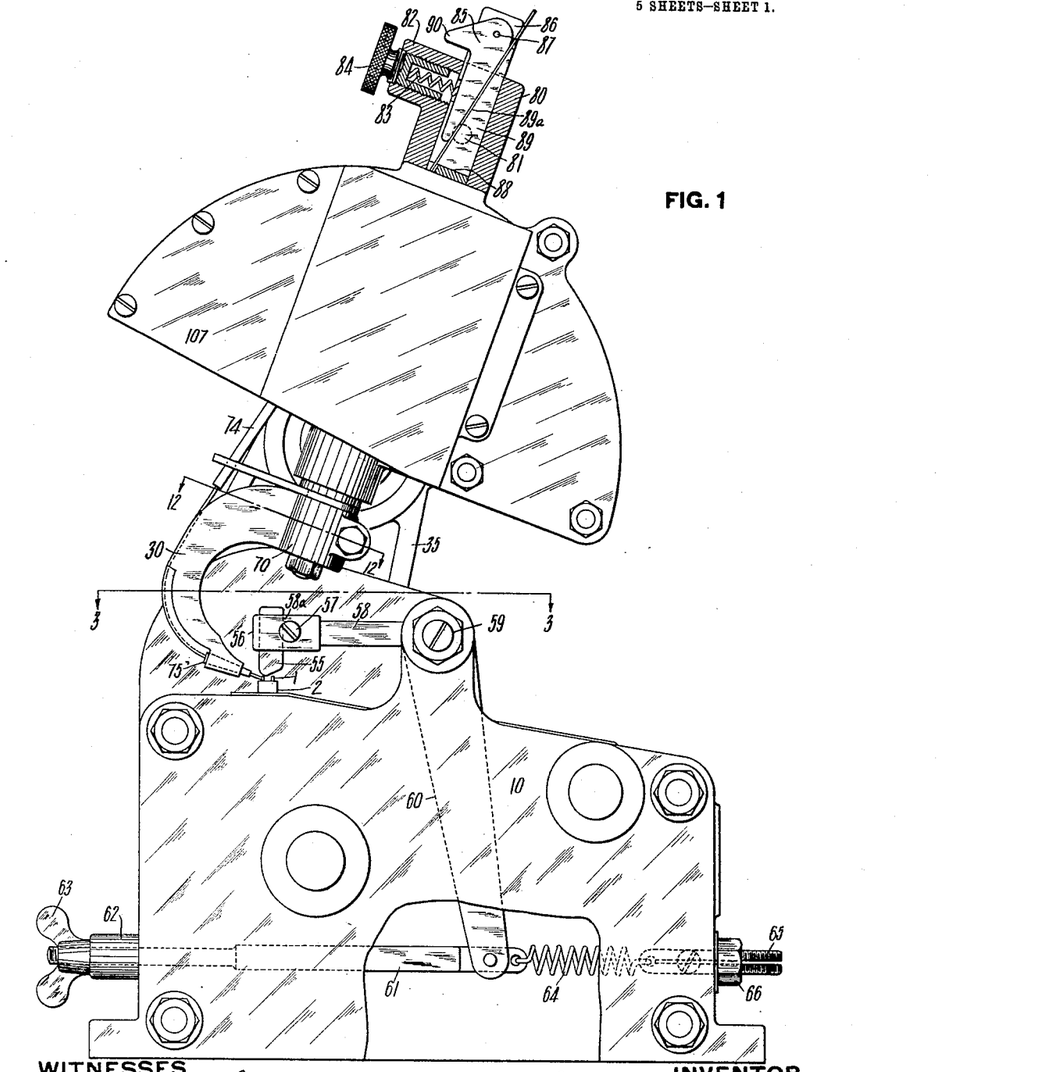
Figure 1 represents a side elevation, partly broken away and in section, of a machine embodying the invention.
Figure 2:
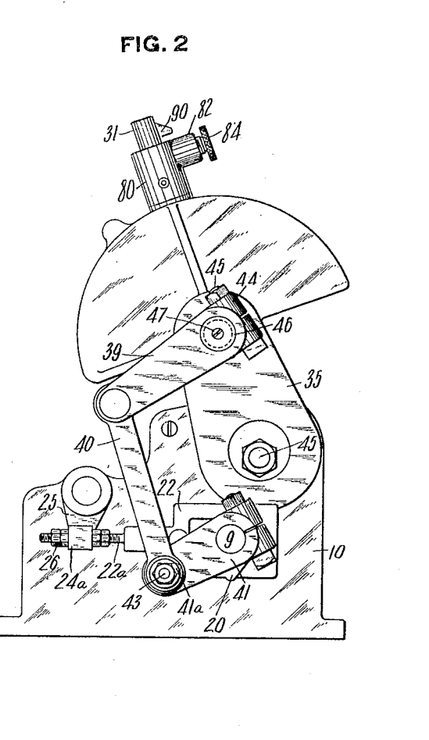
Fig. 2 is an elevation, on a reduced scale, of the opposite side of the machine.
Figure 3:
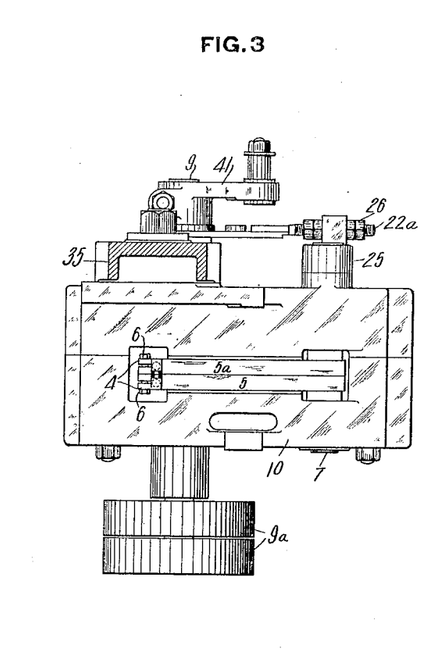
Fig. 3 is a sectional plan view of the same, on the same scale as Fig. 2, and taken on the line 3—3, Fig. 1, the presser foot and bender arm being omitted.
Figure 4:
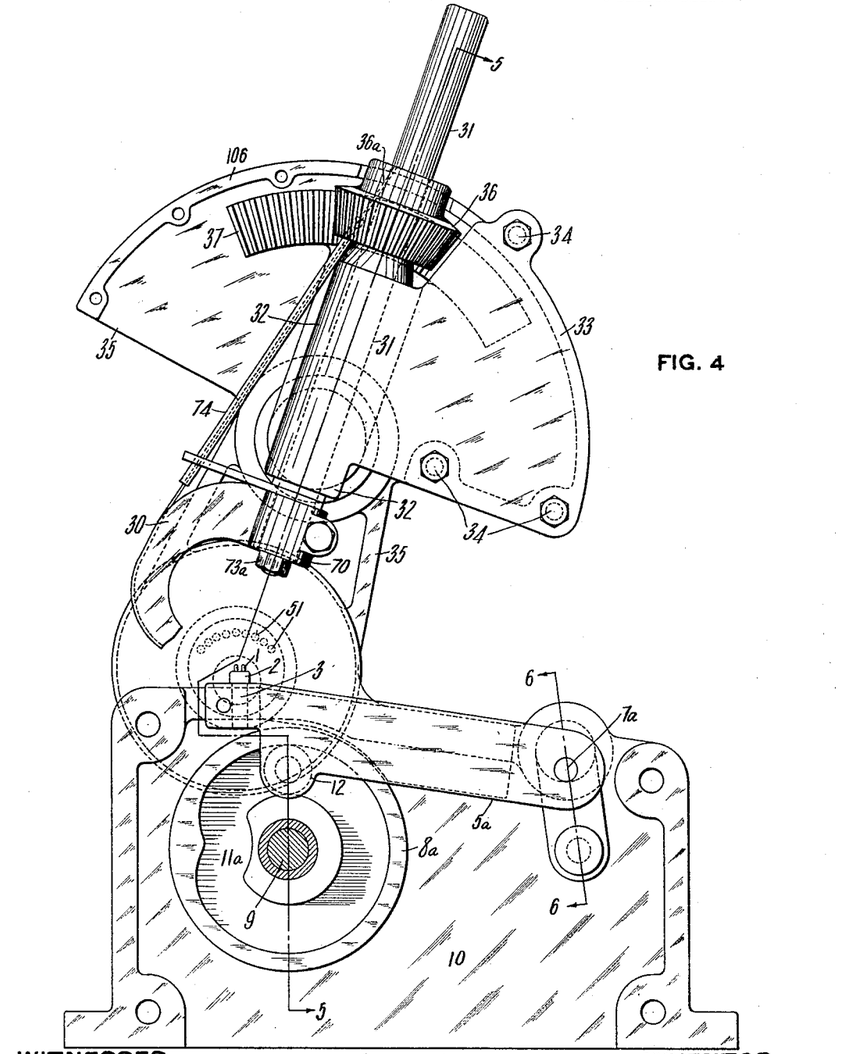
Fig. 4 is in part a side elevation and in part a longitudinal sectional elevation of the machine shown in Fig. 1, the protecting cover plate or guard for the bender shaft being removed.

In the machine shown in Fig. 1 the bender arm, which feeds the wire to the loop forming pins and bends it therearound, is substantially U-shaped and at its upper end is formed to provide a hollow cylindrical sleeve portion 70 split at one side, as at 71, and provided with a clamping bolt 72 so that it may be clamped to the lower end of the bender arm shaft 31. Preferably, a feather 31ᵃ is placed in mating longitudinal grooves in the bender shaft 31 and the sleeve 70 of arm 30, so that the position of the arm 30 on the bender shaft angularly thereof is fixed. Said arm, however, may be adjusted longitudinally of the shaft 31 by an adjusting screw provided with a nut 73ᵃ engaging the lower surface of the sleeve 70 and which is threaded into an aperture in the end of the bender shaft. By loosening the clamping bolt 72 and screwing the bolt 73 in or out, the arm 30 may be adjusted longitudinally on its shaft. Preferably, the wire is supplied to the bender arm from a spool or reel (not shown) supported above the machine and from which the wire is led through a suitable slot or aperture in the upper end of the shaft, then through an aperture 36ᵃ in gear 36 and through a guiding tube 74 down to the bender arm. Tube 74 at its upper end fits a suitable socket in the under side of gear 36 and at its lower end is supported by a bracket rigidly connected in any suitable manner to the shaft 31. From the tube 74 the wire passes along a longitudinal groove or depression 91 in the edge of the arm 30, which prevents it from being displaced during operation, and through a hollow nose 75, which preferably is exteriorly of conical shape, and is adjustably secured in the end of the bender arm. Said nose is preferably formed of hardened steel so that it is durable and will not quickly wear out, due to the friction of the wire passing therethrough. The wire may be maintained taut as it is fed to the bender arm by any suitable tension device. Preferably, however, the tension device is mounted at the extreme upper end of the bender arm shaft 31, and is of the construction shown in the drawings. As indicated, the tension device comprises a sleeve 80 fixedly secured by a set screw 81 to rotate with the shaft. Said sleeve is provided with a lateral boss or enlargement 82 bored out to form a chamber in which is located a spiral compression spring 83, the tension of which may be regulated by an adjusting nut 84. Said spring at its inner ends engages a tension member 85, located in a slot 86 in the end of the shaft and through which the wire is fed, said member swinging on a pivot pin 87 passing through the opposite side members of the shaft. The slot 86 in the shaft may have an inclined bottom wall, but as shown is square at the bottom, as at 88, a triangular filling block 89, having an inclined wall 89ᵃ, being located in the slot in said shaft and clamped between the side portions thereof by set screw 81. With the construction described the spring 83 presses the tension member 85 inwardly against the wire, which passes between said member and the wall 89ᵃ of filling block 89. To enable the wire to be readily inserted through the tension device the tension member 85 is preferably provided with a latch or finger 90, by means of which it may be swung or oscillated about the pin 87 to open a space between the member 85 and the wall 89ᵃ of filling block 89. The wire is threaded through the tension device, the gear 36, the tube 74 and the nose 75 and across the pin blocks, both of which are up at this time. The wire is led between the front and rear pins and bent sharply around the rear pin toward the rear of the machine. The presser foot 55 is then let down to clamp the wire to the pin blocks. The machine is then slowly operated by hand, as by operating a hand wheel, formed for example by an integral portion of the driving pulley, and with the aid of a suitable hand tool to hold and direct the partly formed wire, the first loop of the wire fabric is formed. The power drive of the machine is then thrown on and the mechanism described swings or oscillates the bender shaft and the bender nose 75 toward that side of the machine on which the pin block is depressed. If its amplitude of swing is sufficient it carries the wire across over the depressed pin block and underneath a previously formed loop on the other side of the machine. The depressed pin block at this time is being advanced forwardly by the cam 20 and the mechanism which connects the same to the shaft member on which the depressed pin block carrier is journaled. The depressed pin block then ascends and catches the wire which was carried transversely between its two loop forming pins 1 and clamps it tightly against the presser foot 55, one of the pins entering a previously formed loop or eye. Before, however, the wire is thus clamped, the lever carrying the elevated pin block is retracted or moved rearwardly by the cam 20, as described, to feed or advance the wire fabric one step toward the rear, after which the corresponding cam 8 or 8ª swings the lever 5 or 5ª to depress the elevated pin block. The mechanism described then swings bender arm 30 and the nose 75 toward the other side of the machine and carries the wire back across and over the now lowered pin block and under a previously formed loop on that side of the machine. At the same time the pin block which was retracted and depressed has been advanced in its depressed position by the cam 20. This finishes one complete cycle of operation of the machine.

The tension device described is intended to keep the wire taut as it is fed to and bent around the loop forming pins by the bender arm, as described. Under some circumstances it may be desirable to vary the tension on or slack in the wire while the bender arm is swinging transversely of the machine to bend the wire around a given pin, or, in other words, during different periods in the formation of each successive loop. During the first portion of the swing of the bender arm from one side of the machine to the other the wire is not only partially bent around the loop forming pin on the elevated pin block, but at the same time is drawn through the nose 75 and around the edge thereof, to furnish the additional wire necessary for the new loop being formed. During the later portion of the swinging movement of the bender arm in the same direction there is less feed of the wire or advance thereof through the bender nose, and the effect is mainly to bend the wire around the loop forming pin. It is advantageous, during the first portion of the movement of the bender arm, that the tension on the wire be such as to permit of the necessary feed of the wire, while during the second portion of the movement of the bender arm the feed of the wire should practically cease so that it will be bent around the loop forming pin to closely hug the latter and without appreciable slack in the wire. For the reason stated, the bender arm 30 may be movably mounted on the bender arm shaft in such manner that the position of the nose 75 with relation to the axis of the bender arm shaft and to the loop forming pins may be varied as the arm swings from side to side of the machine.

Figure 8:
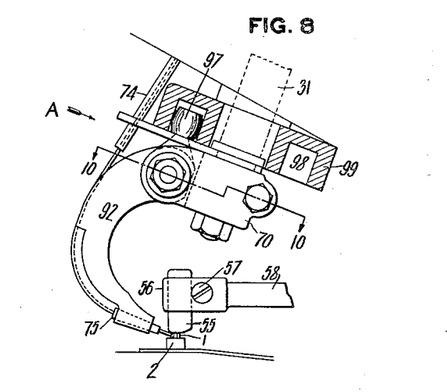
Fig. 8 is a detail view, partly in section, and showing a modified arrangement of bender arm.
Figure 9:
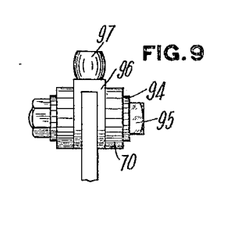
Fig. 9 is a detail end view of the same, looking in the direction of the arrow A, Fig. 8, the wire guide being omitted.
Figure 10:
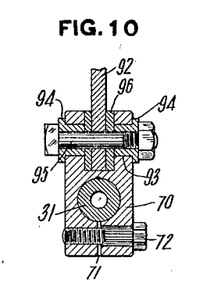
Fig. 10 is a detail sectional view on the line 10—10, Fig. 8.

Figs. 8, 9, and 10 illustrate in detail a modified form of mechanism for securing the results just described. As shown, the bender arm is formed in two parts, namely, a main arm member 92 and a split sleeve 70, which is adjustably secured to the lower end of the bender arm shaft, as before. Sleeve 70 is provided with a transverse bore 93 in which are located bushings or distance pieces 94, in the form of hollow sleeves through which passes a clamping bolt 95. Bolt 95 passes also through an aperture in the main arm member 92 and through the opposite legs of a yoke or arm 96 having a pin or roller 97 on its upper end. The bushings or distance pieces 94 are a close but easy running fit in the bore 93 of the sleeve 70, so that they will easily turn therein, but it will be understood that the nut on bolt 95 may be turned up tightly to clamp rigidly together yoke 96, main arm member 92 and the bushings 94 so that these move together, but are still practically without play or lost motion in the sleeve 70. The journal 32, in which the bender arm shaft 31 rotates, is provided at its lower end with a circular cam 99, into the track or groove 98 of which projects the pin or roller 97 referred to. Cam 99 is rigidly secured to the journal 32 in any desired manner, as by being bolted thereto. With the construction described, as the shaft 31 oscillates to swing the bender from side to side of the machine, the pin or roller 97 travels in the cam track or groove 98 and, according to the conformation thereof, swings or oscillates the main arm member 92 on its pivot 95 and with reference to the axis of the shaft 31. The shape or configuration of the cam track 98 may be varied to suit any conditions and to effect any desired result, but preferably will be such as to cause a little slack in the wire as it is being fed to the pins and tighten the same while it is being bent therearound.

Figure 11:
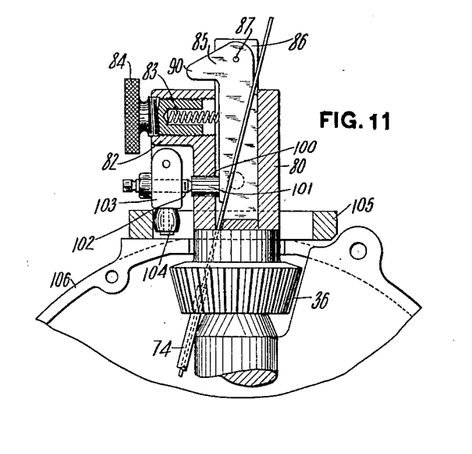
Fig. 11 is a detail sectional view, showing a modified arrangement of tension device and automatic control mechanism therefor.
Figure 12:
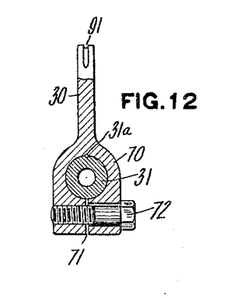
Fig. 12 is a detail sectional view on the line 12—12, Fig. 1.

In connection with the mechanism just described I may also utilize an automatically controlled tension device, such for example as that illustrated in Fig. 11. As there shown the side wall of the sleeve 80 is provided with a bore or aperture 100 in which is located a pin or block 101 with its inner end contacting the lower end of the tension member 85. The outer end of the pin or block 101 is contacted by a member 102, shown as an adjustable screw, threaded through a lever or arm 103 pivotally mounted in the boss 82 of said sleeve. Said arm or lever is provided at its lower end with a pin or roller 104 which engages with an annular cam 105 rigidly secured in any suitable manner to the upper flat surface of the standard or supporting arm 35. The inner surface of cam 105 will be so formed that during that portion of the bending movement of the arm 30 when the wire is pulled tightly about the pin, the pin or roller 104 engages a curved portion of the cam 105 to cause it to swing inwardly and press the pin or block 101 against the presser member 85, thus increasing the grip of the latter upon the wire. When, however, the wire is to be fed through the bending nose 75 and it is desirable to have slack in the wire, the pin or roller 104 will encounter a cut-away portion of the cam to permit the arm or lever 102 to swing slightly outwardly and thus decrease the pressure of the pin or block 101 on the latch 85. This mechanism can be used either alone or in conjunction with the spring 83, which normally and constantly exerts pressure upon the tension member 85.

In the particular machine shown the upper portion of the standard or bender shaft supporting arm 35 is segmental in shape and is provided with an annular rim or flange 106, to which may be bolted or otherwise secured a cover plate or guard 107, said parts forming a gear casing to inclose the wire guiding tube, the bender shaft, and the gearing for operating the same, thereby protecting the same from dirt and avoiding the liability of injury to the operator of the machine, although this is not essential and may be omitted.

The machine described is simple and positive in operation and embodies direct mechanical connections from the main driving shaft to the oscillating bender shaft, which connections are exceedingly efficient and durable in operation. The bender shaft may be adjusted to vary its inclination to the plane of the stay being formed, and may also, by rotation of the eccentric sleeve 46, be adjusted bodily either with or without variation of the inclination of the shaft to the horizontal. These adjustments are useful for varying the degree of tilt or inclination of the loops to the general plane of the stay being formed and to secure proper relation of the nose of the bender arm to the loop forming pins. The bender arm itself may also be adjusted longitudinally of its supporting shaft, to regulate the position of the bender nose vertically with relation to the plane of the stay. Also, the levers or carriers for the pin blocks may be adjusted longitudinally of the machine with relation to each other to secure proper relation between the loop forming pins carried thereby. In addition to the foregoing, both the amplitude of swing of the bender arm and the position thereof angularly with relation to the axis around which it swings may be varied, to secure different amounts of overlap of successive loops or eyes, or, if desired, to produce an unsymmetrical stay. The adjustable eccentric sleeve 46 also provides for bodily adjustment of the bender shaft horizontally relative to the group of pins in the pin blocks.

What I claim is:—

1. In a wire bending machine, the combination of loop-forming pins, carriers therefor arranged to raise and lower the same alternately, an oscillating bending member having its axis in or near the central longitudinal plane of the machine, and a standard supporting said member and angularly adjustable about a transverse axis to vary the inclination of the bending member axis to the plane of the wire fabric being formed.

2. In a wire bending machine, the combination of loop-forming pins, carriers therefor arranged to raise and lower the same alternately, an oscillating bending member having its axis in or near the central longitudinal plane of the machine, a standard carrying said member, a pivot supporting said standard and around which the same is adjustable to vary the inclination of the bending member axis to the plane of the wire fabric being formed, and means for varying the position of said pivot.

3. In a wire bending machine, the combination of loop-forming pins, carriers therefor arranged to raise and lower the same alternately, an oscillating bending member having its axis in or near the central longitudinal plane of the machine, a standard carrying said member, a pivot supporting said standard and around which the same is adjustable to vary the inclination of the bending member axis to the plane of the wire fabric being formed, and means for bodily adjusting said pivot around a fixed pivot to bodily adjust said bending member with reference to the loop-forming pins.

4. In a wire bending machine, the combination of loop-forming pins, carriers therefor arranged to raise and lower the same alternately, an oscillating bending member having its axis in or near the central longitudinal plane of the machine, a fixed stud, a member eccentrically mounted on said stud, and an arm or standard journaled on said eccentric member and carrying said bending member.

5. In a wire bending machine, the combination of loop-forming pins, carriers therefor arranged to raise and lower the same alternately, an oscillating bending member having its axis in or near the central longitudinal plane of the machine, a fixed stud, an eccentric sleeve rotatably adjustable thereon, and an arm or standard journaled on said sleeve and carrying said bending member.

6. In a wire bending machine, the combination of loop-forming pins, carriers therefor arranged to raise and lower the same alternately, an oscillating bending member having its axis in or near the central longitudinal plane of the machine, a fixed stud, an eccentric sleeve rotatably adjustable thereon, an arm or standard journaled on said sleeve and carrying said bending member, and means for locking said eccentric sleeve in adjusted position.

7. In a wire bending machine, the combination of a frame, loop-forming pins, carriers therefor arranged to raise and lower the same alternately, an oscillating bending member having its axis in or near the central longitudinal plane of the machine, a stud fixedly supported on said frame, an eccentric sleeve rotatably adjustable thereon, an arm or standard journaled on said sleeve and carrying said bending member, and means for locking said eccentric sleeve in adjusted position, comprising a locking member movably mounted in said sleeve, said frame being provided with a plurality of sockets spaced circumferentially around the axis of said stud, and said locking member being adapted to be engaged selectively with any one of said sockets.

8. In a wire bending machine, the combination of loop-forming pins, carriers therefor arranged to raise and lower the same alternately, an oscillating bending member having its axis in or near the central longitudinal plane of the machine, a standard supporting said member, a rotatable shaft carried by said standard, a gear segment on said shaft, and operating connections between said segment and said bending member for oscillating the same.

9. In a wire bending machine, the combination of loop-forming pins, carriers therefor arranged to raise and lower the same alternately, an oscillating bending member, a shaft carrying the same and having its axis in or near the central longitudinal plane of the machine, a gear carried thereby, a standard supporting said bending member shaft, a transverse shaft carried by said standard, a gear segment on said shaft and engaging said first-named gear for oscillating said bending member, and means for rotating said transverse shaft.

10. In a wire bending machine, the combination of loop-forming pins, carriers therefor arranged to raise and lower the same alternately, an oscillating bending member, a shaft carrying the same and having its axis in or near the central longitudinal plane of the machine, a driving shaft, link connections between said driving shaft and said bending member shaft for oscillating the same, and means for adjusting said link connections to vary the throw of the bender arm.

11. In a wire bending machine, the combination of loop-forming pins, carriers therefor arranged to raise and lower the same alternately, an oscillating bending member, a shaft carrying the same and having its axis in or near the central longitudinal plane of the machine, a standard supporting said bending member shaft, a transverse shaft carried by said standard and operatively connected to said bending member shaft, and link connections between said driving shaft and said transverse shaft for operating the same.

12. In a wire bending machine, the combination of loop-forming pins, carriers therefor arranged to raise and lower the same alternately, an oscillating bending member, a shaft carrying the same and having its axis in or near the central longitudinal plane of the machine, a standard supporting said bending member shaft, a transverse shaft carried by said standard and operatively connected to said bending member shaft, a driving shaft, a crank arm carried thereby, and a connecting rod pivotally connected at one end to said crank arm and arranged to oscillate said transverse shaft.

13. In a wire bending machine, the combination of loop-forming pins, carriers therefor arranged to raise and lower the same alternately, an oscillating bending member, a shaft carrying the same and having its axis in or near the central longitudinal plane of the machine, a standard supporting said bending member shaft, a transverse shaft carried by said standard and operatively connected to said bending member shaft, a driving shaft, a crank arm carried thereby, and a connecting rod pivotally connected at one end to said crank arm and arranged to oscillate said transverse shaft, the pivot connecting said connecting rod and crank arm being adjustable radially of said driving shaft to vary the throw of said bending member.

14. In a wire bending machine, the combination of loop-forming pins, carriers therefor arranged to raise and lower the same alternately, an oscillating bending member, a shaft supporting the same and having its axis in or near the central longitudinal plane of the machine, a standard carrying said bending member shaft, a transverse shaft carried by said standard and operatively connected to said bending member shaft, an arm rotatably adjustable on said transverse shaft, a driving shaft, and connections between said driving shaft and said arm for swinging the same to oscillate said bending member.

15. In a wire bending machine, the combination of a frame, loop-forming pins, carriers therefor arranged to raise and lower the same alternately, an oscillating bending member, a shaft carrying the same and having its axis in or near the central longitudinal plane of the machine, a standard rotatably adjustable on said frame on a transverse axis to vary the inclination of said bending member shaft to the plane of the wire fabric being formed, a transverse shaft carried by said standard and operatively connected to said bending member shaft, a driving shaft journaled in the frame, and link connections between said main shaft and said transverse shaft for oscillating said bending member.

16. In a wire bending machine, the combination of a frame, loop-forming pins, carriers therefor arranged to raise and lower the same alternately, an oscillating bending member, a shaft carrying the same and having its axis in or near the central longitudinal plane of the machine, a standard rotatably adjustable on said frame on a transverse axis to vary the inclination of said bending member shaft to the plane of the wire fabric being formed, a transverse shaft carried by said standard and operatively connected to said bending member shaft, a driving shaft journaled in the frame, an arm on said transverse shaft, a crank arm on said driving shaft, and a rod connecting said transverse shaft arm and said crank arm.

17. In a wire bending machine, the combination of a frame, loop-forming pins, carriers therefor arranged to raise and lower the same alternately, an oscillating bending member, a shaft carrying the same and having its axis in or near the central longitudinal plane of the machine, a standard rotatably adjustable on said frame on a transverse axis to vary the inclination of said bending member shaft to the plane of the wire fabric being formed, a transverse shaft carried by said standard and operatively connected to said bending member shaft, a driving shaft journaled in the frame, an arm rotatably adjustable on said transverse shaft, a crank arm on said driving shaft, and a rod connecting said crank arm and said transverse shaft arm.

18. In a wire bending machine, the combination of loop-forming pins, carriers therefor arranged to raise and lower the same alternately, a shaft supported in or near the central longitudinal plane of the machine, means for oscillating said shaft, and a bending member carried by said shaft and arranged to bend the wire around said pins, said bending member being adjustable longitudinally on said shaft to vary its position with relation to the loop-forming pins.

19. In a wire bending machine, the combination of loop-forming pins, carriers therefor arranged to raise and lower the same alternately, an oscillating shaft supported in or near the central longitudinal plane of the machine, an arm provided at one end with a sleeve fitting said shaft and at its other end arranged to feed the wire to and bend the same around said pins, and means for adjusting said sleeve longitudinally of said shaft and clamping the same thereon in adjusted position.

20. In a wire bending machine, the combination of loop-forming pins, carriers therefor arranged to raise and lower the same alternately, an oscillating shaft supported in or near the central longitudinal plane of the machine, an arm provided at one end with a split sleeve surrounding said shaft and having means for clamping the same thereon, said arm at its other end being arranged to feed the wire to and bend the same around said pins, and a screw threaded into the end of said shaft and engaging said sleeve and arranged to adjust the same longitudinally of said shaft.

21. In a wire bending machine, the combination of loop-forming pins, carriers therefor arranged to raise and lower the same alternately, an oscillating bending member, a shaft carrying the same and having its axis in or near the central longitudinal plane of the machine, a standard in which said shaft is journaled, said shaft being provided with a gear, a transverse shaft journaled in said standard, a gear segment on said shaft and meshing with said bending member shaft gear, a backing member secured to said standard behind said gear segment and arranged to maintain the same in mesh with its coöperating gear, and means for rotating said transverse shaft.

22. In a wire bending machine, the combination of loop-forming pins, means for raising and lowering the same alternately, means for bending the wire around said pins, and means for bodily moving said pins in the plane of the wire fabric being formed to feed the same through the machine.

23. In a wire bending machine, the combination of loop-forming pins, means for raising and lowering the same alternately, means for bending the wire around said pins, and cam mechanism for alternately moving said pins horizontally in the plane of the wire fabric being formed to feed the same through the machine.

24. In a wire bending machine, the combination of loop-forming pins, a main shaft having connections for raising and lowering said pins alternately, and separate mechanism operatively connected to said main shaft for moving said pins horizontally in the plane of the wire fabric being formed.

25. In a wire bending machine, the combination of loop-forming pins, a main shaft having connections for raising and lowering said pins alternately, separate mechanism operatively connected to said main shaft for moving said pins horizontally in the plane of the wire fabric being formed, and an adjustable connection in said mechanism for varying the relative positions of said pins longitudinally of the machine.

26. In a wire bending machine, the combination of loop-forming pins, means for bending the wire around said pins, a main shaft having connections for raising and lowering said pins alternately, a cam on said shaft, a yoke embracing said shaft and reciprocated by said cam, a shaft arranged when oscillated to alternately move said pins horizontally in the plane of the wire fabric being formed to feed the same through the machine, and a member adjustably connected to said yoke and arranged to oscillate said shaft, said member being adjustable to vary the relative positions of said pins longitudinally of the machine.

27. In a wire bending machine, the combination of loop-forming pins, means for bending the wire around said pins, carriers for said pins, separate shaft members pivotally supporting the rear ends of said carriers, and cams arranged to engage said carriers between the pivots thereof and the loop-forming pins carried thereby for raising and lowering said pins alternately.

28. In a wire bending machine, the combination of loop-forming pins, means for bending the wire around said pins, carriers for said pins, shaft members arranged end to end and at different levels, trunnions carried by the ends of said shaft members and substantially in line with each other, said trunnions forming pivots for the rear ends of said pin carriers, and means for oscillating said shaft members to bodily move said carriers alternately in opposite directions in the plane of the wire fabric being formed to thereby feed the same through the machine.

29. In a wire bending machine, the combination of loop-forming pins, means for bending the wire around said pins, carriers for said pins, separate shaft members arranged end to end and at different levels, trunnions carried by the ends of said shaft members and substantially in line with each other, said trunnions forming pivots for the rear ends of said carriers, means for oscillating one of said shaft members, and connections between said shaft members so arranged that both rotate simultaneously in the same direction to thereby bodily move said carriers alternately in opposite directions in the plane of the wire fabric being formed to feed the same through the machine.

30. In a wire bending machine, the combination of loop-forming pins, means for bending the wire around said pins, carriers for said pins, separate shaft members arranged end to end and at different levels, trunnions carried by the ends of said shaft members and substantially in line with each other, said trunnions forming pivots for the rear ends of said carriers, arms connected to said shaft members, one arm being slotted, a pin rigidly fixed to one of said arms and at its other end engaged in the slot in the other arm, and means for oscillating one of said shaft members.

31. In a wire bending machine, the combination of a main frame, loop-forming pins, carriers therefor arranged to raise and lower the same alternately, means for bending the wire around said pins, a shaft rotatably supported in said frame, an arm projecting therefrom and carrying a foot located over said pins, a second arm rigidly connected to said shaft, and means for adjusting the position of said second arm to vary the pressure of said foot on the wire fabric being formed.

32. In a wire bending machine, the combination of a main frame, loop-forming pins, carriers therefor arranged to raise and lower the same alternately, means for bending the wire around said pins, a shaft rotatably mounted in said frame, an arm projecting therefrom and carrying a foot located over said pins, a second arm rigidly connected to said shaft, and a spring connected to said second arm and arranged to yieldingly swing said arms and shaft and press said foot down upon the wire fabric being formed.

33. In a wire bending machine, the combination of a main frame, loop-forming pins, carriers therefor arranged to raise and lower the same alternately, means for bending the wire around said pins, a shaft rotatably mounted in said frame, an arm projecting therefrom and carrying a foot located over said pins, a second arm rigidly connected to said shaft, a spring connected to said second arm and arranged to yieldingly swing said arms and shaft and press said foot down upon the wire fabric being formed, and means for adjusting the tension of said spring.

34. In a wire bending machine, the combination of a main frame, loop-forming pins, carriers therefor arranged to raise and lower the same alternately, means for bending the wire around said pins, a shaft rotatably mounted in said frame, an arm projecting therefrom and carrying a foot located over said pins, a second arm rigidly connected to said shaft, a rod pivotally connected to said second arm and having a threaded end passing through an aperture in said frame, and a nut on said rod for adjusting the same longitudinally to raise the presser foot from the wire fabric being formed.

35. In a wire bending machine, the combination of loop-forming pins, carriers therefor arranged to raise and lower the same alternately, an oscillating shaft having its axis in the central longitudinal plane of the machine, a bender arm thereon having a nose at its end through which the wire is fed to said pins, and means for adjusting said arm on said shaft to vary the position of said nose transversely with relation to the shaft axis.

36. In a wire bending machine, the combination of loop-forming pins, carriers therefor arranged to raise and lower the same alternately, a shaft having its axis in the central longitudinal plane of the machine, an arm movably connected to said shaft and having a nose at its end through which the wire is fed to said pins, and means for moving said arm on said shaft to adjust the position of said nose transversely with relation to the bender shaft axis.

37. In a wire bending machine, the combination of loop-forming pins, carriers therefor arranged to raise and lower the same alternately, an oscillating shaft having its axis in the central longitudinal plane of the machine, an arm movably mounted on said shaft and having a nose through which the wire is fed to said pins, and means for moving said arm on said shaft as the shaft is oscillated to thereby vary the position of said nose with reference to the loop-forming pins during the bending of the wire therearound.

38. In a wire bending machine, the combination of loop-forming pins, carriers therefor arranged to raise and lower the same alternately, an oscillating shaft having its axis in the central longitudinal plane of the machine, an arm movably mounted on said shaft and having a nose through which the wire is fed to said pins, and a fixed cam operatively connected to said arm and arranged to adjust the same as the shaft is oscillated to thereby vary the position of said nose with reference to the loop-forming pins during the bending of the wire therearound.

39. In a wire bending machine, the combination of loop-forming pins, carriers therefor arranged to raise and lower the same alternately, an oscillating shaft having its axis in the central longitudinal plane of the machine, an arm pivotally connected to said shaft and arranged to bend the wire around said pins, a fixed cam, and means on said arm arranged to engage said cam to thereby swing said arm on said shaft and vary its position with reference to the loop-forming pins during the bending of the wire therearound.

40. In a wire bending machine, the combination of loop-forming pins, carriers therefor arranged to raise and lower the same alternately, an oscillating shaft having its axis in the central longitudinal plane of the machine, an arm pivotally connected to said shaft and arranged to bend the wire around said pins, a fixed cam, and a member connected to said arm and having a roller arranged to engage said cam as the shaft is oscillated to thereby swing said arm on its pivot and vary its position with reference to the loop-forming pins during the bending of the wire therearound.

41. In a wire bending machine, the combination of loop-forming pins, carriers therefor arranged to raise and lower the same alternately, an oscillating shaft having its axis in the central longitudinal plane of the machine and carrying an arm arranged to bend the wire around said pins, said shaft being slotted at its upper end, a tension member located in said slot and arranged to engage the wire being fed to said arm, said tension member being movably connected to said shaft, and a spring arranged to engage said tension member to yieldingly press the same against the wire.

42. In a wire bending machine, the combination of loop-forming pins, carriers therefor arranged to raise and lower the same alternately, an oscillating shaft having its axis in the central longitudinal plane of the machine and carrying an arm arranged to bend the wire around said pins, said shaft being slotted at its upper end and provided in said slot with an inclined surface, a tension member movably mounted in said slot and arranged to engage the wire, and a spring operatively engaging said tension member to thereby cause the same to press the wire against said inclined surface.

43. In a wire bending machine, the combination of loop-forming pins, carriers therefor arranged to raise and lower the same alternately, an oscillating shaft having its axis in the central longitudinal plane of the machine and carrying an arm arranged to bend the wire around said pins, said shaft being slotted at its upper end and provided in said slot with an inclined surface, a tension member movably mounted in said slot and arranged to engage the wire, a spring operatively engaging said tension member to thereby cause the same to press the wire against said inclined surface, and means for varying the tension of said spring.

44. In a wire bending machine, the combination of loop-forming pins, carriers therefor arranged to raise and lower the same alternately, an oscillating shaft having its axis in the central longitudinal plane of the machine and carrying an arm arranged to bend the wire around said pins, said shaft being slotted at its upper end, a tension member movably mounted in said slot and arranged to engage the wire being fed to said arm, a sleeve surrounding the slotted end of said shaft and having a lateral bore, a spring in said bore engaging said tension member, and a screw threaded into said bore for varying the tension of said spring.

45. In a wire bending machine, the combination of loop-forming pins, carriers therefor arranged to raise and lower the same alternately, an oscillating shaft having its axis in the central longitudinal plane of the machine, an arm carried thereby and arranged to bend the wire around said pins, a gear on said shaft having an aperture through which the wire is fed to said arm, means engaging said gear for oscillating said shaft, and a tension device on said shaft above said gear.

46. In a wire bending machine, the combination of loop-forming pins, carriers therefor arranged to raise and lower the same alternately, an oscillating shaft having its axis in the central longitudinal plane of the machine, the upper end of said shaft being slotted, an arm carried by said shaft and arranged to bend the wire around said pins, a gear on said shaft having an aperture through which the wire is fed to said arm, means operatively connected to said gear for oscillating said shaft, a tension device on said shaft above said gear, comprising a sleeve surrounding the slotted portion of said shaft, a tension member pivotally mounted in said slot and arranged to engage the wire, and a spring mounted in said sleeve and engaging said member.

47. In a wire bending machine, the combination of loop-forming pins, carriers therefor arranged to raise and lower the same alternately, an oscillating shaft having its axis located in the central longitudinal plane of the machine, an arm carried thereby and arranged to bend the wire around said pins, a tension member located on the upper end of said shaft and arranged to engage the wire as it is fed to said arm, and means for varying the pressure of said member on the wire as said shaft is oscillated.

48. In a wire bending machine, the combination of loop-forming pins, carriers therefor arranged to raise and lower the same alternately, means for bending the wire around said pins, a tension device through which the wire passes as it is bent around the loop-forming pins, and means for varying the tension of said device as the wire is bent around said pins.

49. In a wire bending machine, the combination of loop-forming pins, carriers therefor arranged to raise and lower the same alternately, an oscillating shaft having its axis in the central longitudinal plane of the machine, a bending member carried thereby and arranged to bend the wire around said pins, a movable tension member carried by the upper end of said shaft and arranged to engage the wire as it is fed to said bending member, a fixed cam, and a movable arm operated by said cam during oscillation of the shaft, and arranged to vary the pressure of said member on the wire as it is bent around the loop-forming pins.

50. In a wire bending machine, the combination of loop-forming pins, carriers therefor arranged to raise and lower the same alternately, an oscillating shaft having its axis in the central longitudinal plane of the machine, an arm carried thereby and arranged to bend the wire around said pins, said shaft being slotted at its upper end, a swinging tension member located in said slot and arranged to engage the wire, a sleeve surrounding the slotted portion of said shaft and secured thereto, an arm pivotally mounted in said sleeve and arranged to engage said swinging tension member, a fixed cam, and means on said arm arranged to engage said cam to thereby vary the tension of said member on the wire, as said shaft oscillates about its axis.

51. In a wire bending machine, the combination of movable pin carriers arranged to raise and lower alternately, said carriers being provided with sockets therein, pin blocks detachably secured in said sockets and having loop-forming pins thereon, and means for bending the wire around said pins.

52. In a wire bending machine, the combination of movable block carriers arranged to raise and lower alternately, the ends of said carriers being split to provide sockets, pin blocks having shanks fitting said sockets and carrying loop-forming pins, bolts for securing said pin blocks in said sockets, and means for bending the wire around said pins.

In testimony whereof, I have hereunto set my hand.

JOHN F. KITCHEN.

Witnesses:
MARCUS M. BEEMAN,
T. F. CHARLTON.

Copies of this patent may be obtained for five cents each, by addressing the "Commissioner of Patents, Washington, D. C."